Oct. 29, 1968  J. O. MELTON ET AL  3,408,124
IDLER ARM CONSTRUCTION
Filed April 18, 1966

INVENTORS
JAMES O. MELTON,
THOMAS B. WILKINSON &
BY  JAMES H. JACKSON

Dunlap and Janey
ATTORNEYS

United States Patent Office 3,408,124
Patented Oct. 29, 1968

3,408,124
IDLER ARM CONSTRUCTION
James O. Melton, 1208 Cruce St., Norman, Okla. 73069,
and Thomas B. Wilkinson, 208 Ranchwood Drive
73137, and James H. Jackson, 1830 Oakhill Drive
73127, both of Oklahoma City, Okla.
Filed Apr. 18, 1966, Ser. No. 543,326
10 Claims. (Cl. 308—238)

ABSTRACT OF THE DISCLOSURE

An idler arm assembly including an idler arm having a hub at one end thereof with a bore extending through the hub, and a ball-carrying stud connected to the idler arm with the ball portion of the stud positioned in the bore of the hub. The ball portion is clad with a plastic liner which is in bearing engagement with a pair of complementary sleeve segments positioned in the bore around the ball portion and liner. Confining end caps are positioned in the hub at each end of the bore and seal the bearing.

---

Figure 1:
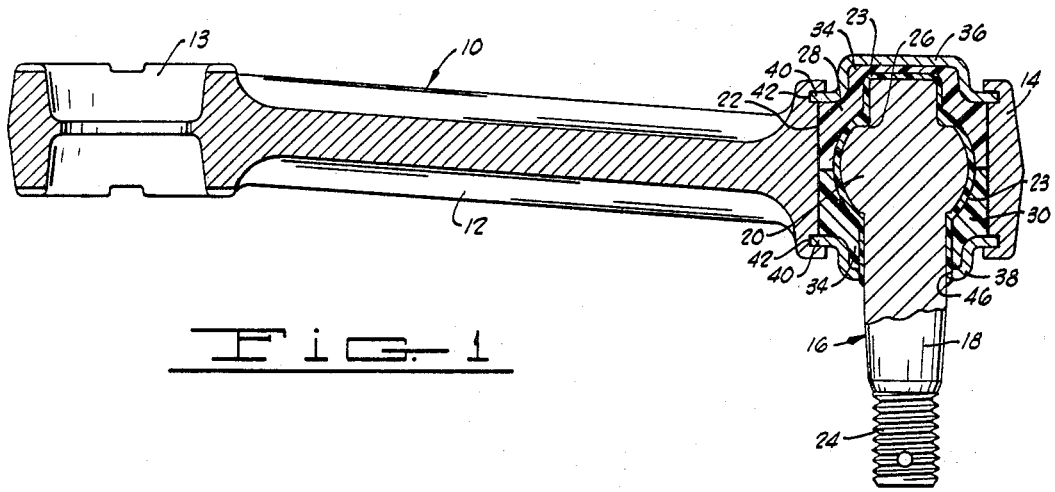

This invention relates to the construction of idler arms of the type used on automobiles and the like. More specifically, the invention relates to an idler arm construction in which a bearing is provided between two relatively moving members, with such bearing being characterized in having contacting, relatively moving bearing surfaces constructed of high density synthetic resin materials.

Recently the use of high density synthetic resins or plastics in various types of ball joint structures has been increasingly employed as a means of simultaneously reducing the high cost of steel, ball bearing low friction structures previously used, and improving the frictional characteristics of such joints over that which normally characterizes metal-to-metal sliding bearing structures. Certain types of high density resin structures possess high mechanical strength and are further characterized in having a very low coefficient of friction which permits the moving parts of bearings constructed therefrom to turn easily on each other without freezing or binding. Resins are also available which have, in addition to the foregoing properties, high resistance to corrosion and a long service life.

The present invention relates to improved types of idler arm assemblies of the type used on automobiles and the like, with such idler arm assemblies including an elongated idler arm, a ball-carrying spindle journaled in one end of the idler arm for movement relative thereto, and a resinous bearing structure having a low coefficient of friction and interpositioned between the metallic parts of the idler arm and the ball carried by the stud, which ball is positioned within a hub or socket defined by the idler arm. More specifically described, the idler arm assembly of the invention comprises an idler arm having a hub at one end thereof with a bore extending through the hub, and a ball-carrying stud connected to the idler arm with the ball portion of the stud positioned loosely in the bore of the hub of the idler arm. The ball portion of the stud is clad with a plastic liner which is in bearing engagement with plastic sleeve means positioned in the bore of the hub portion of the idler arm and surrounding the ball portion of the stud. Finally, the idler arm assemblies each include confining end caps which are positioned in the hub at each end of the bore therethrough, and which function to seal the bearing connection between the ball-carrying stud and the idler arm from infiltration of deleterious materials, and also to prevent or limit movement of the sleeve means and the stud in an axial direction in the bore through the hub.

In a preferred embodiment of the invention, the end caps which seal the bearing between the stud and the idler arm are relatively thin metallic members which are pressed at their outer peripheral edges into annular slots formed in the internal wall of the hub portion of the idler arm adjacent the bore through this hub. It is further preferred, in the construction of the idler arm assemblies, to employ high density synthetic resins in the construction of the liner and sleeve means, with the resins used in the construction of each of these elements having different molecular structures so as to avoid the bonding through interpolymerization of these elements to each other when the idler arm assembly is fully loaded, and is used under particularly stringent operating conditions which cause the bearing surfaces to become highly heated and placed under substantial compressive loads.

It is further preferred, in a particularly useful embodiment of the invention, to provide a flexible dust cap structure which bears against the hub of the idler arm adjacent one end of the bore therethrough, and which extends along and surrounds the shank of the spindle which projects from the hub of the idler arm. The flexible dust cap structure assures further protection against the infiltration of dust, mud, water and other deleterious materials between the bearing surfaces of the idler arm assembly.

From the foregoing description of the invention, it will be apparent that it is a major object of the invention to provide an improved idler arm assembly which is characterized in permitting relatively easy turning movement between two interconnected members, and which is characterized in having a long and trouble-free operating life.

Another object of the invention is to provide an idler arm assembly which can be quickly and economically constructed, and which is capable of being relatively heavily loaded without damage to the bearing surfaces contained therein.

In addition to the foregoing described objects and advantages, additional objects and advantages will become apparent as the following detailed description of the invention is read in conjunction with the accompanying drawings which illustrate the invention.

Figure 2:
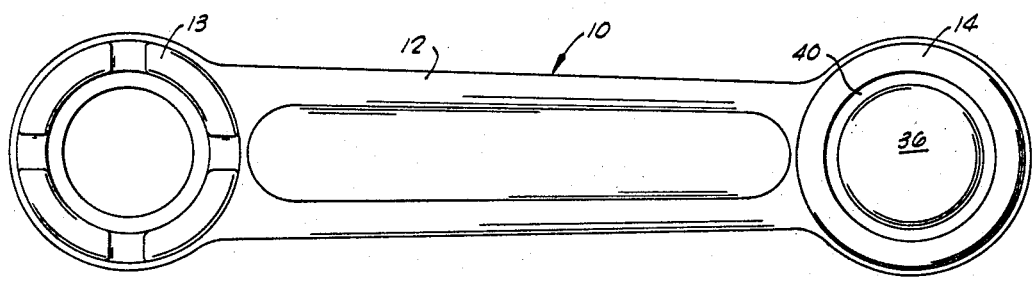
Figure 3:
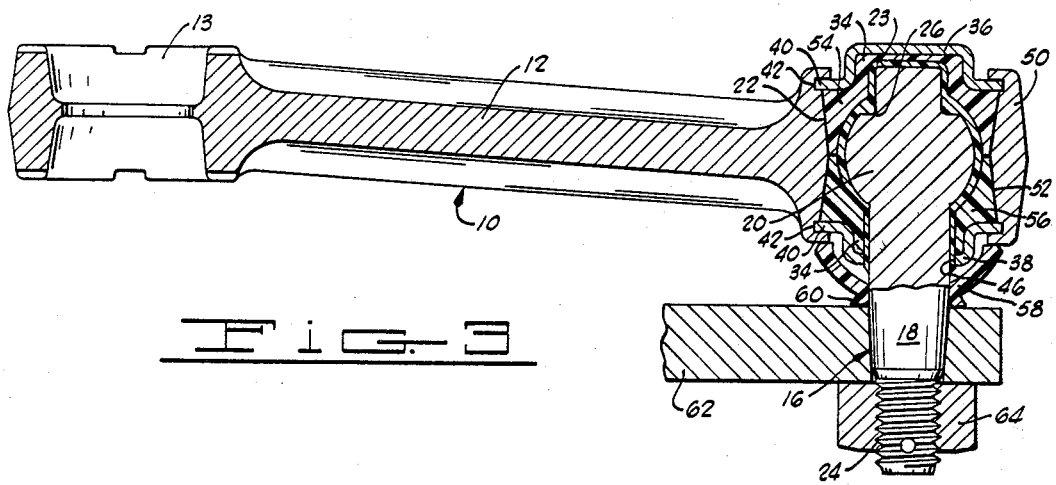

In the drawings:
FIGURE 1 is a horizontal sectional view of one embodiment of the idler arm assembly of the invention.
FIGURE 2 is a plan view of the idler arm assembly depicted in FIGURE 1.
FIGURE 3 is a horizontal sectional view through another embodiment of the invention.

Referring now to the drawings in detail, and particularly to FIGURE 1, the idler arm assembly of the invention is designated generally by reference character 10 and includes an elongated idler arm 12 having a first hub portion 13 at one end thereof adapted for connection to the frame support of an automobile, and having a second hub portion 14 at the other end thereof which is interconnected to a ball-carrying spindle or stud designated generally by reference character 16. The ball-carrying stud 16 includes a generally cylindrical shank 18 which extends diametrically through an integrally formed ball portion 20. The hub 14 has a generally cylindrical bore 22 formed therethrough for receiving the ball portion 20.

A liner 23 which is preferably constructed of a high density synthetic resin is clad upon the ball portion 20 and on the free end of the cylindrical shank 18 which projects beyond the ball portion 20. The liner 23 also extends along the shank 18 for a substantial distance toward a threaded end portion 24 of the shank. An annular groove 26 is formed around the ball portion 20 in a plane extending normal to the axis of the cylindrical bore 22 and of the shank 18 and functions to assist in retaining the liner 22 in position on the ball-carrying stud 16. Positioned in the bore surrounding the ball portion 20 and in bearing contact with the liner 23 is a two-part sleeve structure, which is preferably constructed of a high density synthetic resin of differing molecular structure than the synthetic resin of which the liner 23 is constructed. Most preferably, the sleeve structure parts 28 and 30 are constructed of nylon, and the liner 23 is constructed of an ethyl cellulose thermoplastic of the type sold under the registered trademark Selcon by the Cellanese Corporation of America.

The two-part sleeve structure includes (a) an upper part 28 having a frusto-spherical cavity therein communicating with a small cylindrical cavity which receives the protruding portion of the cylindrical shank 18, and (b) a lower part 30 which also contains a frusto-spherical cavity communicating with a generally cylindrical opening in the lower part through which the cylindrical shank passes out of the bore 22 through the hub portion 14 of the idler arm 12. The frusto-spherical cavities in the upper and lower parts 28 and 30 of the synthetic resin sleeve structure are complementary in configuration and conjunctively define a generally spherical cavity which receives and encloses the ball portion 20 of the ball-carrying stud 16.

The outer peripheral portion of the upper and lower parts 28 and 30 of the synthetic resin sleeve structure are generally cylindrical in configuration, and are pressed tightly into the bore 22 which extends through the hub 14 of the idler arm 12. Each of the parts 28 and 30 of the sleeve structure is provided with a neck portion 34 which projects out of the bore 22 in the hub 14 and bears against dished upper and lower metallic end caps 36 and 38, respectively. Each of the end caps 36 and 38 are provided with annular peripheral flange portions 40 which project into and interlock with grooves 42 provided adjacent the opposite ends of the bore 22 through the hub 14. The lower end cap 38 is provided with an aperture 46 in the center thereof which is dimensioned to mate with and snugly encircle the lower portion of the liner 23.

In the operation of the idler arm assembly, the idler arm 12 is connected through the hub portion 13 to the frame support of the vehicle, and the ball-carrying stud 16 is connected by means of a suitable nut at its end 24 to a relatively movable steering assembly drag link. The stud 16 turns freely about its longitudinal axis, and the ball portion 20 thereof and its liner 23 move relative to the upper and lower parts 28 and 30 of the sleeve structure. Due to the relatively low coefficient of friction of the contacting high density synthetic resins, the stud can turn easily about its axis without binding or high frictional resistance. The upper and lower metallic end caps 36 and 38 retain the relatively moving parts of the bearing in continuous contact with each other, and prevent the development of play in the bearing. The end caps also function to prevent the infiltration of mud, dirt and other deleterious materials to the interior of the bearing.

A slightly modified embodiment of the invention is illustrated in FIGURE 3 of the drawings. Where structural elements are used in this embodiment of the invention which are identical to structural elements present in the FIGURE 1 embodiment, identical reference numerals have been used in identifying such elements. The idler arm 12 illustrated in FIGURE 3 is provided with a hub 50 on the end thereof connected to the ball-carrying stud 18 which differs from the hub 14 of the FIGURE 1 embodiment in that the hub 50 is provided with a bore 52 extending therethrough which is circular in cross-section, but which has a smaller diameter at the central portion of the bore than at each of the open ends thereof. The walls of the bore 52 thus taper inwardly, or converge inwardly from the bore openings, as contrasted with the smooth walled, cylindrical bore 22 through the hub 14 in the FIGURE 1 embodiment.

For purposes of accommodation to the bore 52, the two parts of the sleeve structure used in the FIGURE 3 embodiment and designated by reference numerals 54 and 56 are each provided with a frusto-conical outer peripheral surface. This permits these sleeve structure parts 54 and 56 to be made slightly oversized and forced or wedged into the bore 52 and retained in this compressed condition by the placement of the end caps 36 and 38 in the ends of the bore. Due to the loading in compression of the upper and lower parts 54 and 56 of the sleeve structure, as the bearing surfaces of these parts become worn, or as the high density synthetic resin liner 23 becomes worn, bearing contact is maintained between the sleeve structure and the liner and looseness and play does not develop.

It will be further perceived in referring to the embodiment of the invention illustrated in FIGURE 3 that a dished or frusto-spherically shaped dust cap 58 is provided around the cylindrical shank 18 of the ball-carrying stud 16 and has an upper edge bearing against the hub portion 50 of the idler arm 12. A small annular flange 60 is integrally formed with the frusto-spherical dust cap around the opening through which the cylindrical shank 18 passes, and such flange bears against the upper surface of a drag link 62 which is connected by a nut 64 to the ball-carrying stud 16. By tightening the nut 64, the dust cap 58 is placed in compression and bears sealingly against the surface of the hub portion 50 which surrounds the bore 52. The dust cap functions to prevent the infiltration of dust and water into the bearing.

From the foregoing description of the invention, it will have become apparent that the present invention provides an improved idler arm assembly which is compact and economical in construction, is characterized in having a long and trouble-free operating life, and includes a bearing structure which permits relatively low resistance turning movement between the ball-carrying stud 16 and the idler arm 12.

Although certain embodiments of the invention have been herein depicted and described in order to provide an example of the employment of the principles of the invention, it is to be understood that various modifications and innovations can be effected in such depicted and described structures without departure from the basic principles of the invention. All such changes which continue nevertheless to rely upon these principles are deemed to be circumscribed by the spirit and scope of the invention except as the same may be necessarily limited by the appended claims or reasonable equivalents thereof.

We claim:
1. An idler arm assembly comprising:
   an idler arm having a hub at one end thereof with a bore through said hub;
   a ball-carrying stud connected to said idler arm with the ball portion of said stud positioned in the bore of said hub;
   a high density synthetic resin liner cladding said ball portion;
   high density synthetic resin sleeve means in said bore surrounding said ball portion, and slidably engaging said liner; and
   confining cup-shaped end caps positioned in said hub at each end of said bore and limiting movement of said sleeve means and stud in an axial direction in the bore through said hub.

2. An idler arm assembly as defined in claim 1 wherein said high density synthetic resin sleeve means is of two-part construction, each part of said sleeve means having a frusto-spherical cavity therein, and one of said parts having an aperture therethrough communicating with the frusto-spherical cavity therein for accommodating said stud.

3. An idler arm assembly as defined in claim 1 wherein the bore through the hub of said idler arm is cylindrical, and said hub is further characterized in having an annular groove therein at each end of said bore for receiving the peripheral edges of said confining end caps.

4. An idler arm assembly as defined in claim 1 wherein said ball portion has an annular groove therein lying in a plane extending normal to the axis of said stud and the axis of said bore through said hub, and said groove receives a portion of the liner cladding said ball portion.

5. An idler arm assembly defined in claim 2 wherein said ball-carrying stud has a generally cylindrical shank formed integrally with said ball portion and projecting from opposite sides thereof; and the other of said parts of said sleeve has a cylindrical cavity communicating with the frusto-spherical cavity therein and receiving the part of said cylindrical shank which projects from one of the sides of said ball portion.

6. An idler arm assembly as defined in claim 1 wherein said high density synthetic resin liner is constructed of a synthetic resin having a different molecular structure than the synthetic resin of which said sleeve means is constructed.

7. An idler arm assembly as defined in claim 2 wherein each of said sleeve means parts has a neck portion projecting out of said bore, and each of said end caps is dished and receives the neck portion of one of said sleeve means parts.

8. An idler arm assembly as defined in claim 2 wherein said bore is circular in cross-section and has a smaller diameter at its center than at each of its ends, and each of said sleeve means parts has a frusto-conical outer peripheral surface and is pressed into said bore.

9. An idler arm assembly as defined in claim 5 wherein said resin liner, in addition to cladding said ball portion, also clads the part of said generally cylindrical shank portion which projects from one side of said ball portion into the cylindrical cavity in the other of said sleeve means parts, and a portion of the remainder of said generally cylindrical shank portion.

10. An idler arm assembly as defined in claim 1 and further characterized to include a dust cap around a portion of the stud outside said hub bore and bearing against one of said confining end caps.

References Cited

UNITED STATES PATENTS

| | | | |
|---|---|---|---|
| 1,908,789 | 5/1933 | Ragan | 287—90 |
| 2,095,566 | 10/1937 | Lundelius | 280—95 |
| 2,324,984 | 7/1943 | Brown | 308—238 |
| 2,754,141 | 7/1956 | Latzen | 287—90 |
| 3,025,090 | 3/1962 | Langen | 289—90 |
| 3,086,801 | 4/1963 | Herbenar | 287—90 |
| 3,108,830 | 10/1963 | Fierstine | 308—36.1 |
| 3,112,123 | 11/1963 | True | 308—238 X |
| 3,149,863 | 9/1964 | Melton | 287—90 |
| 3,177,020 | 5/1965 | Dumpis | 308—238 X |
| 3,220,756 | 11/1965 | Templeton | 287—87 |
| 3,273,924 | 9/1966 | Maxeiner | 287—90 |
| 3,306,640 | 2/1967 | Melton | 287—90 |
| 3,329,454 | 7/1967 | Melton | 287—90 |
| 3,125,364 | 3/1964 | Springer | 289—90 |
| 3,250,556 | 5/1966 | Couch | 308—72 X |

FOREIGN PATENTS

| | | |
|---|---|---|
| 602,181 | 7/1960 | Canada. |
| 460,254 | 1/1937 | Great Britain. |
| 886,545 | 1/1962 | Great Britain. |
| 895,068 | 4/1962 | Great Britain. |
| 1,006,462 | 10/1965 | Great Britain. |

OTHER REFERENCES

German printed application, 10,373 (1956).

MARTIN P. SCHWADRON, *Primary Examiner.*

L. L. JOHNSON, *Assistant Examiner.*